United States Patent [19]

Mishima et al.

[11] Patent Number: 5,787,596
[45] Date of Patent: Aug. 4, 1998

[54] APPARATUS FOR SIMULTANEOUSLY MEASURING THICKNESS OF BOTTOM WALL AND INSIDE DIAMETER OF BOTTOMING HOLE

[75] Inventors: Takashi Mishima, Hiratsuka; Kenji Saito, Fujisawa, both of Japan

[73] Assignee: Fuji Oozx, Inc., Japan

[21] Appl. No.: 794,999

[22] Filed: Feb. 5, 1997

[51] Int. Cl.$^6$ .............................. G01B 13/10; G01B 5/06
[52] U.S. Cl. ...................... 33/548; 33/832; 33/611; 33/543.1; 33/549; 33/DIG. 2
[58] Field of Search .................... 33/548, 783, 803, 33/805, 832, 833, 600, 611, 655, 543.1, 549, DIG. 2

[56] References Cited

U.S. PATENT DOCUMENTS 5,022,161  6/1991  Gray et al. ............................ 33/548
5,653,037  8/1997  Hasegawa et al. .................. 33/DIG. 2

Primary Examiner—Christopher W. Fulton
Attorney, Agent, or Firm—Zarley, McKee, Thomte, Voorhees, & Sease

[57] ABSTRACT

An apparatus for simultaneously measuring the thickness of a bottom wall and the inside diameter of a bottoming hole. The apparatus includes a measurement auxiliary unit; a measurement head removably mounted at a lower end portion of the measurement auxiliary unit, the measurement head having an outside diameter fittable in a bottoming hole of a workpiece such as a tappet; a nozzle, provided in the measurement head, for jetting outward a compressed air supplied from an air micrometer; and an electric micrometer, provided over the measurement auxiliary unit, for detecting a vertical displacement of the measurement auxiliary unit.

4 Claims, 4 Drawing Sheets

FIG.4
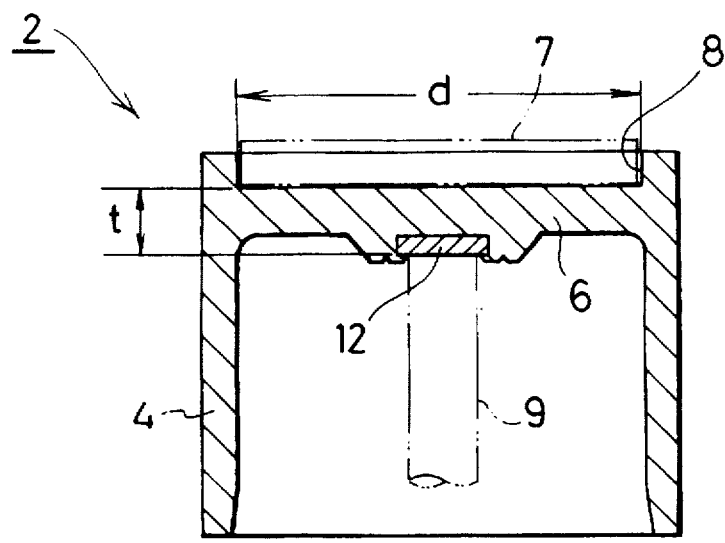
FIG.5A
FIG.5B
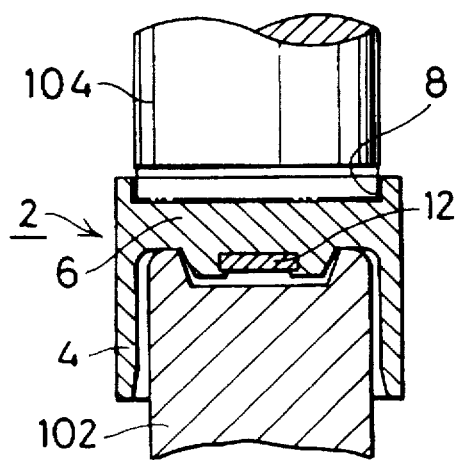

APPARATUS FOR SIMULTANEOUSLY MEASURING THICKNESS OF BOTTOM WALL AND INSIDE DIAMETER OF BOTTOMING HOLE

BACKGROUND OF THE INVENTION

The present invention relates to an apparatus for measuring a workpiece having a bottoming hole in an upper portion of a top wall such as a tappet used for a direct acting type valve mechanism of an internal combustion engine, and particularly to an apparatus for simultaneously measuring the thickness of the top wall (bottom wall) and the inside diameter of the bottoming hole of the workpiece such as a tappet. I As shown in FIG. 4, a tappet 2 used for an internal combustion engine is formed into a cylindrical body in which the upper end portion thereof is closed by a top wall 6 and a bottoming hole 8 in which a valve gap adjusting shim 7 is to be fitted is formed in the upper portion of the top wall 6. For the tappet made of an aluminum alloy, it has a hard chip 12 fitted in the center portion of the back surface side of the top wall 6 on which the axial end of an engine valve 9 is to be abutted.

In such a tappet 2, if there are produced errors in dimensional accuracies of both a thickness "t" from the upper end surface of the top wall 6 to the lower end surface of the chip 12 and an inside diameter "d" of the bottoming hole 8, the former error exerts adverse effect on the valve gap and the latter error causes rattle when the shim 7 is fitted in the bottoming hole 8 or makes it impossible to fit the shim 7 in the bottoming hole 8. Accordingly, it is necessary to confirm, by measurement, whether or not each of the thickness "t" and the inside diameter "d" is in an allowable range.

Conventionally, the thickness "t" and the inside diameter "d" have been separately measured in two measuring steps. Specifically, in a first step shown in FIG. 5A, it is confirmed whether or not the inside diameter "d" is in an allowable range by inserting the cylindrical portion 4 of the tappet 2 around a measurement base 102 from top to bottom, and inserting a columnar inside diameter measurement gauge 104 having a predetermined diameter in the bottoming hole 8 of the tappet held by the measurement base 102. Subsequently, in a second step shown in FIG. 5B, the tappet 2 is transferred onto a different measurement base 106, it is confirmed whether or not the thickness of the top wall 6 including the chip 12 is in an allowable range by measuring the position of the upper surface of the top wall 6 on the basis of the lower end surface of the chip 12 using a probe 108 such as a dial gauge, and comparing the measured result with a predetermined valve of a master workpiece.

The above-described prior art measurement method is poor in working efficiency because it requires the two separate steps, and also it is not necessarily good in measurement accuracy.

SUMMARY OF THE INVENTION

An object of the present invention is to provide an apparatus for simultaneously measuring the thickness of a bottom wall and the inside diameter of a bottoming hole so as to improve working efficiency and to enhance measurement accuracy.

To achieve the above object, according to the present invention, there is provided an apparatus for simultaneously measuring the thickness of a bottom wall and the inside diameter of an bottoming hole of a workpiece, including: a measurement auxiliary unit; a measuring head removably mounted on a lower end portion of said measurement auxiliary unit, said measuring head having an outside diameter fittable in the bottoming hole of the workpiece with a clearance put therebetween; a nozzle, provided at a lower end portion of said measuring head, for jetting outward a compressed air supplied from an air micrometer: and a displacement detecting means, provided over said measurement auxiliary unit, for detecting a vertical displacement of said measurement auxiliary unit.

With this configuration, since the measurement head of the air micrometer is provided at the lower end portion of the measurement auxiliary unit and the displacement detecting means is provided at the upper portion of the measurement auxiliary unit, the thickness of a top wall and the inside diameter of a bottoming hole of a workpiece can be simultaneously measured only by fitting the lower end portion of the measurement auxiliary unit in the bottoming hole, thereby improving the working efficiency and enhancing the measurement accuracy.

The measurement auxiliary unit and said displacement detecting means may be vertically movably held on a bracket lifted/lowered by a lifting/lowering means, and said measurement auxiliary unit may be usually biased downward by a biasing means.

With this configuration, measurement can be effectively performed, and further since a damping action is produced by operation of the lifting/lowering means when the measurement auxiliary unit is abutted on the workpiece, the wear amount of the abutment surface can be reduced.

The apparatus of the present invention may further include a workpiece holding base, provided under said measurement auxiliary unit, for holding the entire workpiece by supporting a lower end surface of the bottoming hole.

With this configuration, since the vertical positioning of a workpiece is accurately performed, the measurement accuracy of the thickness of a bottom wall of a bottoming hole can be improved.

The apparatus of the present invention may further include a workpiece carrying apparatus, provided in the vicinity of said workpiece holding base, for mounting or dismounting the workpiece to or from said workpiece holding base.

With this configuration, it is possible to realize full automatic measurement for the thickness of a bottom wall and the inside diameter of a bottoming hole of a workpiece.

BRIEF DESCRIPTION OF THE DRAWINGS

The features and advantages of the present invention will become more apparent from the following description of the preferred embodiments of the invention in conjunction with the accompanying drawings, in which:

FIG. 4 is a vertical sectional view of a tappet as a workpiece to be measured using the measurement apparatus of the present invention; and FIGS. 5A and 5B are schematic views showing a prior art measurement method for a tappet, wherein FIG. 5A shows a step for measuring the inside diameter of a bottoming hole, and FIG. 5B shows a step for measuring the thickness of a top wall of the bottoming hole.

DETAILED DESCRIPTION OF THE PREFERRED EMBODIMENT

Hereinafter, a preferred embodiment of the present invention will be described with reference to the drawings.

It is to be noted that a tappet similar to that shown in FIG. 4 is used as a workpiece in the embodiment, and therefore, parts corresponding to those of the tappet shown in FIG. 4 are indicated by the same numerals.

Figure 1:
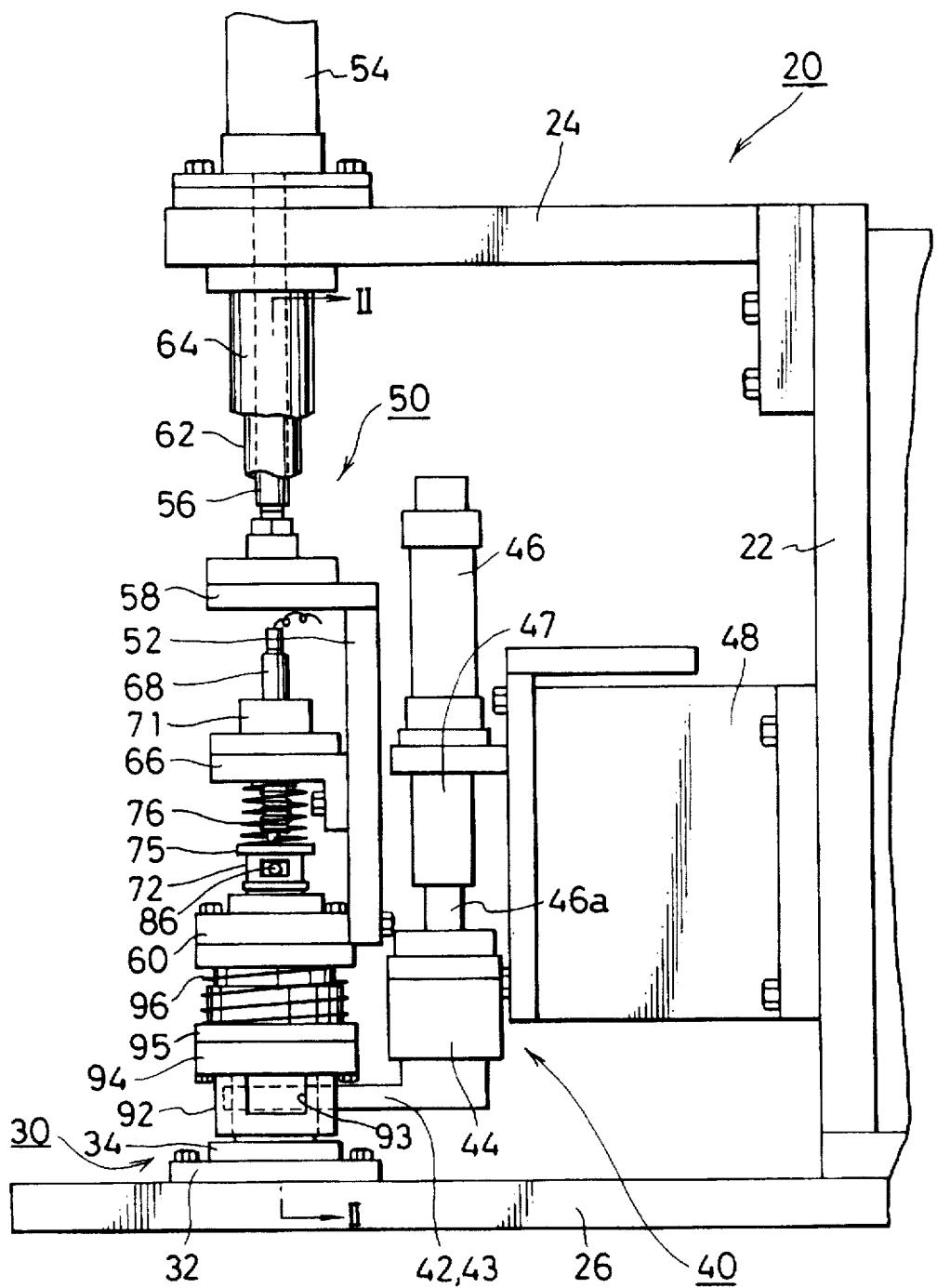
FIG. 1 is a side view of an embodiment of a measurement apparatus according to the present invention.
Figure 2:
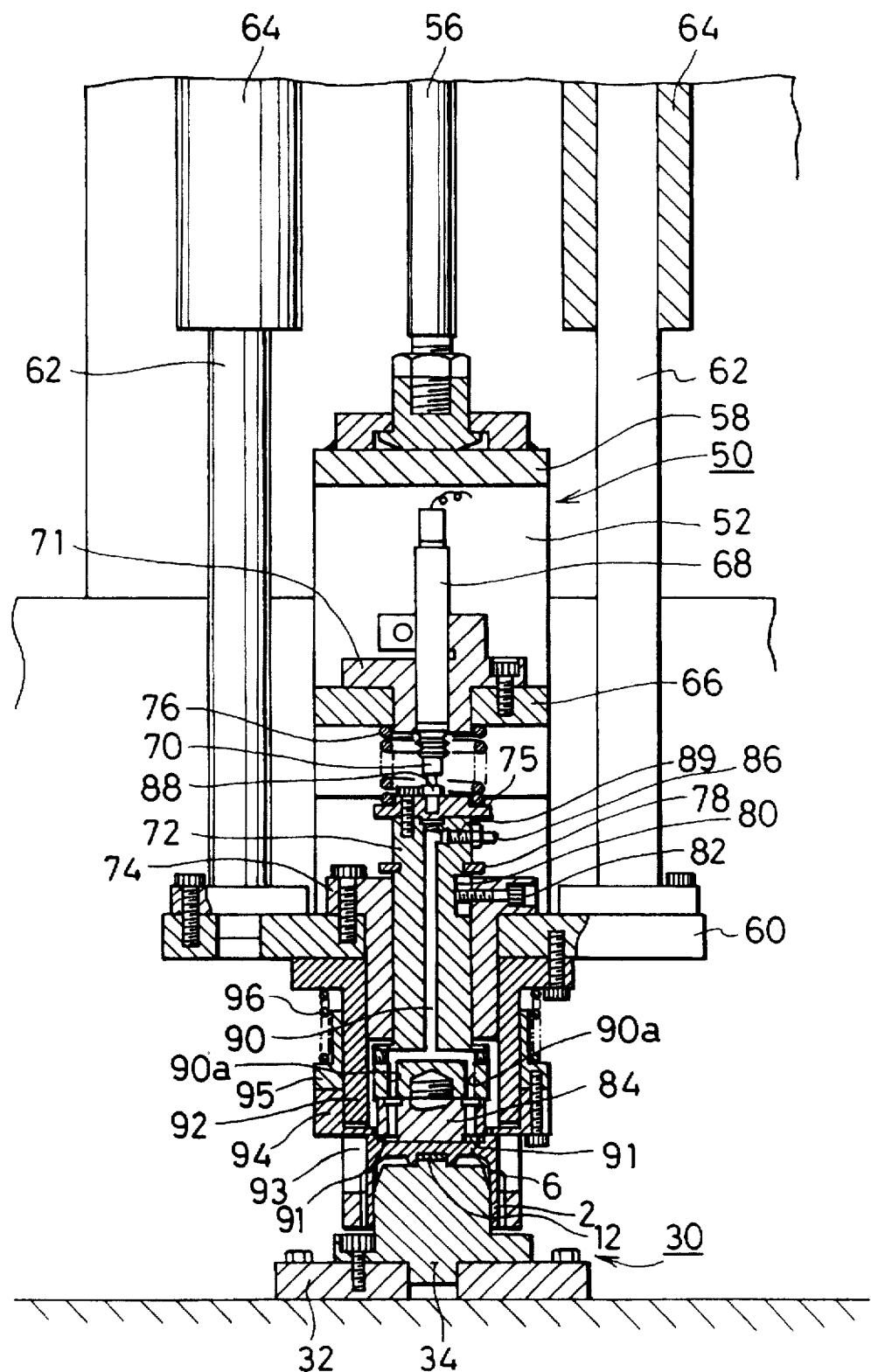
FIG. 2 is an enlarged vertical sectional view taken on line II—II of FIG. 1, showing essential portions of the measurement apparatus.

Referring to FIGS. 1 and 2, reference numeral 22 indicates an upright frame having upper and lower end portions to which a horizontal supporting plate 24 and a base plate 26 are respectively fixed in such a manner as to extend forward.

A measurement base 30 for positioning and holding a tappet 2 is mounted on the upper surface of a front portion of the base plate 26. The measurement base 30 includes a base 32 and a workpiece holding base 34 fixed on the base 32 with bolts.

The tappet 2 is tightly inserted from top to bottom around the workpiece holding base 34 in such a manner that the center portion of the upper surface of the workpiece holding base 34 is abutted on the lower surface of the chip 12. The tappet 2 is thus fixedly held and also vertically positioned. In addition, the workpiece holding base 34 is exchangeably mounted on the base 32 in accordance with the size of the tappet 2.

Reference numeral 40 indicates a workpiece carrying apparatus mounted on the frame 22 for holding the tappet 2 and automatically mounting or dismounting it to or from the workpiece holding base 34 of the measurement base 30.

The workpiece carrying apparatus 40 includes a known air chuck 44 having a pair of holding pieces 42, 43 for holding the cylindrical portion of the tappet 2; an air cylinder 46 lifting/lowering the air chuck 44; and a moving apparatus 48 for transversely moving the tappet 2 together with the air chuck 44 and the air cylinder 46.

Reference numeral 47 indicates a guide bush for guiding a piston rod 46a of the air cylinder 46.

A measurement mechanism 50 is provided over the work holding base 34 in the center axial line thereof in such a manner as to be vertically movably suspended from the supporting plate 24.

A forward extending upper plate 58 of the bracket 52 is connected to a lower end of a piston rod 56 of a downward extending air cylinder 54 fixed on the supporting plate 24. Lower ends of a pair of vertically extending guide rods 62 are fixed on right and left end portions of a forward extending lower plate 62 connected to the lower end of the bracket 52. Upper end portions of both the guide rods 62 are each slidably fitted in a pair of guide bushes 64 fixed on the supporting plate 24, so that the bracket 52 can be stably lifted/lowered while being guided by both the guide rods 62.

A gauge holder 71 is fixed on an intermediate plate 66 removably fixed at a central portion of the bracket 52. A known differential transformer type electric micrometer 68 as the displacement detecting means is vertically fitted in the gauge holder 71 with a probe 70 downward, and it is held by fastening an upper slotted portion of the gauge holder 71 with a screw.

A columnar measurement auxiliary unit 72 is held at the center of the lower plate 60 of the bracket 52 in such a manner as to be vertically slidably fitted in a guide bush 74 fixed on the lower plate 60. The measurement auxiliary unit 72 is downward biased by a compressed coil spring 76 interposed between a spring stopper 75 fixed at the upper end of the measurement auxiliary unit 72 and the intermediate plate 66, and it is restricted in its downward movement by a stop ring 78. The measurement auxiliary unit 72 is also rotation-stopped by inserting a screw 82 in a vertical groove 80 formed in the outer peripheral surface thereof.

The measurement auxiliary unit 72, which is interposed between the probe 70 of the electric micrometer 68 and the upper surface of the top wall 6 of the tappet 2, has a function of transmitting a vertical displacement of the top wall 6 of the tappet 2 to the electric micrometer 68, and also has a function as a detection portion of an air micrometer for measuring the inside diameter of the bottoming hole 8 formed in the upper surface of the top wall 6. A measurement head 84 is removably mounted on the leading end portion of the measurement auxiliary unit 72 (see FIG. 3).

The lower end surface of the measurement head 84 of the measurement auxiliary unit 72 is inserted in the bottoming hole 8 of the tappet 2 with a clearance put therebetween to such an extent as to be brought in contact with the upper surface of the top wall 6. The measurement head 84 has at the upper end portion thereof a receiving member 88 for receiving the probe 70 of the electric micrometer 68 in a state being brought in contact therewith.

An air pipe 86 connected to a known flow rate type air micrometer main body is mounted to an air introducing port 89 formed in the upper end portion of the measurement auxiliary unit 72. A compressed air flowing from the air pipe 86 into the air introducing port 89 passes through an air passage 90 provided at the center of the measurement auxiliary unit 72, branch passage 90a, 90a formed at the lower end portion of the measurement auxiliary unit 72, and flow passages 84a, 84a formed in the measurement head 84, and is jetted in the bottoming hole 8 through nozzles composed of passages 91, 91 formed of outward directing grooves provided in the leading end surface of the measurement head 84 and the upper surface of the top wall 6 of the tappet 2.

Figure 3:
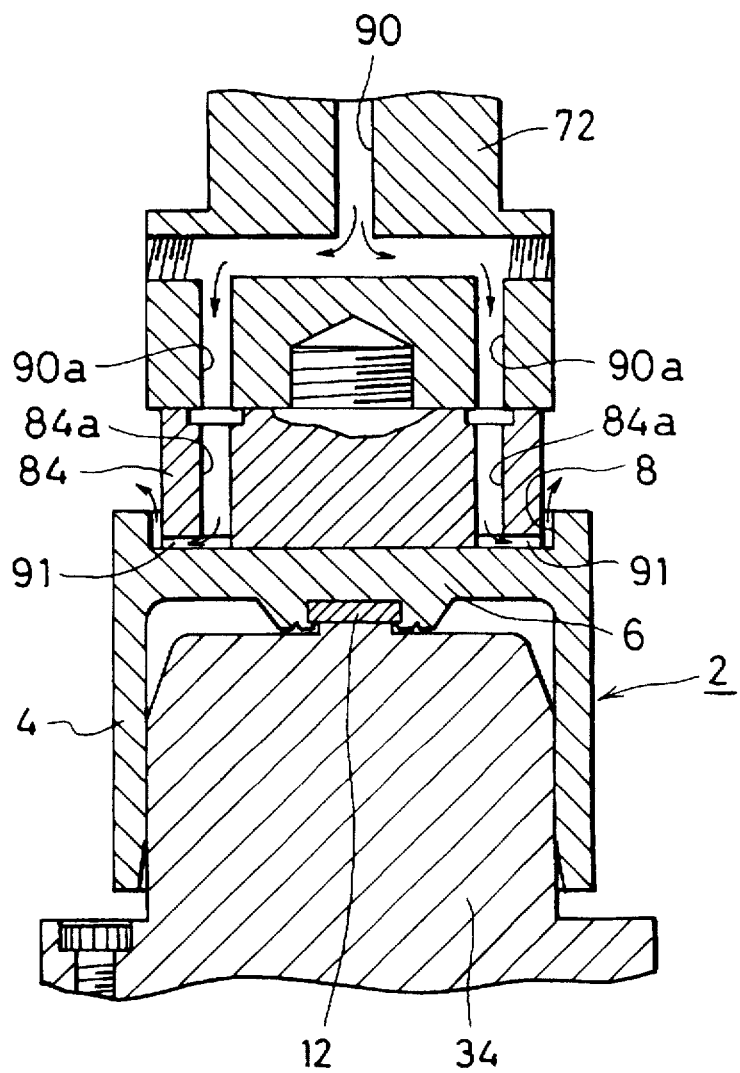
FIG. 3 is an enlarged sectional view of essential portions of the measurement apparatus, showing a state in which a measurement head is inserted in a bottoming hole of a tappet.

The air having flown out of the passages 91 is discharged to the outside through a gap between the measurement head 84 and the bottoming hole 8 as shown in FIG. 3. The inside diameter of the bottoming hole 8 can be thus measured by detecting the discharged flow rate of the air in terms of the displacement of a float of the air micrometer main body. Specifically, the discharged flow rate of the air is proportional to a magnitude of the gap between the measurement head 84 and the bottoming hole 8 and the float is vertically displaced in response to the magnitude of the gap, and accordingly, by previously adjusting the zero-point of the float using a master workpiece having a predetermined inside diameter of the bottoming hole 8, it can be easily decided on the basis of the displacement of the float whether or not the inside diameter of the bottoming hole 8 is in an allowable range.

Reference numeral 92 indicates a guide cylinder fixedly suspended from the lower surface of the lower plate 60 of the bracket 52 in such a manner as to surround the guide bush 74, which functions to hold the outer peripheral surface of the tappet 2 held by the workpiece holding base 34. A plurality of vertical slots 93 are formed in the outer peripheral wall of the guide cylinder 92, and a plurality of inward claws 94 fixed at the lower end of a spring stopper 95 slidably fitted around the guide cylinder 92 are each inserted in the vertical slots 93. Each claw 94, which is biased downward by a compressed coil spring 96, functions to press the upper end surface of the bottoming hole 8 of the tappet 2 when the measurement mechanism 50 is entirely lowered at the time of measurement and to separate the tappet 2 from the guide cylinder 92 when the measurement mechanism 50 is lifted after completion of measurement.

Next, a procedure for measuring the thickness of a top wall and the inside diameter of a bottoming hole using the measurement apparatus in this embodiment will be described.

Before start of measurement, the workpiece carrying apparatus 40 is in the stand-by condition at a position apart from the measurement base 30 and the bracket 52 of the measurement mechanism 50 is located at the upper limit position.

Indication values of the electric micrometer 68 for measurement of the thickness of the top wall 6 and the air micrometer main body for measurement of the inside diameter of the bottoming hole are previously zero-adjusted using a master workpiece.

When a starting switch for automatic measurement is depressed, the workpiece carrying apparatus 40 is operated, and the air chuck 44 holding the tapper 2 is moved up to a position directly over the workpiece holding base 34.

The air chuck 44 is then lowered by operation of the air cylinder 46 and inserts the tappet 2 from top to bottom around the workpiece holding base 34. After that, the air chuck 44 is lifted up to the standby position with both the holding pieces 42, 43 opened.

Next, the bracket 52 of the measurement mechanism 50 is lowered to a specified position by operation of the air cylinder 54, and the guide cylinder 92 is inserted from top to bottom around the tappet 2 and a plurality of the claws 94 are abutted on the upper edge of the tappet 2. The tappet 2 is thus stably held. At the same time, the lower end of the measurement head 84 is fitted in the bottoming hole 8 of the tappet 2 and abutted on the upper surface of the top wall 6, so that the measurement auxiliary unit 72 is lifted against a biasing force of the compressed coil spring 76 and the receiving member 88 at the upper end of the measurement auxiliary unit 72 presses upward the probe 70 of the electric micrometer 68.

Thus, the displacement of the upper surface of the top wall 6 of the tappet 2 is detected by the electric micrometer 68, followed by comparison with a predetermined reference value, and is converted into the thickness from the lower surface of the chip 12 to the upper surface of the top wall 6.

At the same time, an air supplied from the air micrometer main body is allowed to pass through the passages 91 of the measurement head 84 and is then discharged from the gap between the measurement head 84 and the bottoming hole 8 of the tappet 2. The inside diameter of the bottoming hole 8 is automatically measured by the air micrometer main body on the basis of the flow rate of the air thus discharged.

After completion of measurement, the bracket 52 is lifted, and the air chuck 44 moved from the stand-by position holds the tappet 2 and draws it from the workpiece holding base 34. Thus, only acceptable workpieces are put in an acceptable workpiece box or transferred to the next step, while rejected workpieces are carried to a different section.

The present invention can be applied to measurement of the thickness of a top wall of a tappet of a type having no chip 12, and also to measurement of a bottoming hole of a workpiece other than the tappet.

Additionally, although the measurement mechanism 50 side is lifted/lowered in the embodiment, the workpiece holding base 34 side may be lifted/lowered using a suitable lifting/lowering means.

While the preferred embodiment of the invention has been described using specific terms, such description is for illustrative purposes only, and it is to be understood that changes and variations may be made without departing from the scope of claims wherein:

What is claimed is:

1. An apparatus for simultaneously measuring the thickness of a bottom wall and the inside diameter of an bottoming hole of a workpiece, comprising:

a measurement auxiliary unit;

a measuring head removably mounted on a lower end portion of said measurement auxiliary unit, said measuring head having an outside diameter fittable in the bottoming hole of the workpiece with a clearance put therebetween;

a nozzle, provided at a lower end portion of said measuring head, for jetting outward a compressed air supplied from an air micrometer; and displacement detecting means, provided over said measurement auxiliary unit, for detecting a vertical displacement of said measurement auxiliary unit.

2. An apparatus according to claim 1, wherein said measurement auxiliary unit and said displacement detecting means are vertically movably held on a bracket lifted/lowered by lifting/lowering means, and said measurement auxiliary unit is usually biased downward by biasing means.

3. An apparatus according to claim 1, further comprising a workpiece holding base, provided under said measurement auxiliary unit, for holding the entire workpiece by supporting a lower end surface of the bottoming hole.

4. An apparatus according to claim 1, further comprising a workpiece carrying apparatus, provided in the vicinity of said workpiece holding base, for mounting or dismounting the workpiece to or from said workpiece holding base.

* * * * *